United States Patent
Chawla et al.

(10) Patent No.: US 11,805,338 B2
(45) Date of Patent: Oct. 31, 2023

(54) SYSTEMS AND METHODS FOR ENABLING SMART NETWORK INTERFACE CARD AS AN ADVANCED TELEMETRY APPLIANCE

(71) Applicant: Dell Products L.P., Round Rock, TX (US)

(72) Inventors: Gaurav Chawla, Austin, TX (US); Hendrich M. Hernandez, Round Rock, TX (US); Lee E. Ballard, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/243,923

(22) Filed: Apr. 29, 2021

(65) Prior Publication Data

US 2022/0353589 A1 Nov. 3, 2022

(51) Int. Cl.
*H04Q 9/00* (2006.01)
*G06F 17/40* (2006.01)

(52) U.S. Cl.
CPC ............ *H04Q 9/00* (2013.01); *G06F 17/40* (2013.01); *H04Q 2209/30* (2013.01); *H04Q 2209/40* (2013.01); *H04Q 2209/70* (2013.01)

(58) Field of Classification Search
CPC .. H04Q 9/00; H04Q 2209/30; H04Q 2209/40; H04Q 2209/70; G06F 17/40
See application file for complete search history.

(56) References Cited

U.S. PATENT DOCUMENTS

| | | | |
|---|---|---|---|
| 2017/0220407 A1* | 8/2017 | Estrada | G06F 11/3495 |
| 2017/0364561 A1* | 12/2017 | Wu | G06N 20/00 |
| 2018/0157509 A1* | 6/2018 | Suryanarayana | G06F 9/45558 |
| 2018/0288503 A1* | 10/2018 | Chayat | H04Q 9/00 |
| 2018/0359184 A1* | 12/2018 | Inbaraj | H04Q 9/00 |
| 2020/0012501 A1* | 1/2020 | Suryanarayana | G06F 21/52 |

* cited by examiner

*Primary Examiner* — Benjamin M Thieu
(74) *Attorney, Agent, or Firm* — Jackson Walker L.L.P

(57) ABSTRACT

An information handling system may include a processor, a management controller communicatively coupled to the processor and configured for out-of-band management of the information handling system, and a smart network interface card communicatively coupled to the processor and the management controller and configured to receive telemetry information from telemetry sources of the information handling system and perform advanced processing of the telemetry information.

19 Claims, 4 Drawing Sheets

SYSTEMS AND METHODS FOR ENABLING SMART NETWORK INTERFACE CARD AS AN ADVANCED TELEMETRY APPLIANCE

TECHNICAL FIELD

The present disclosure relates in general to information handling systems, and more particularly to methods and systems for enabling a smart network interface card as an advanced telemetry appliance for an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It has long been desirable that information handling systems include mechanisms to log telemetry metadata regarding operation of information handling systems, that can later be used for analysis, debugging, and/or other purposes. Traditionally, such telemetry information has been collected via software programs executing on a host processor that consume host resources including the host processor and memory. Such collection of telemetry information also requires an operating system to be executing on the host processor, without a mechanism to collect and save operating system-based telemetry up to the point of an operating system failure.

Further, computing nodes are typically not self-analyzing and self-healing, making deployment of telemetry services complex in large environments. End users may be interested in providing bare-metal cloud services without an operating system or hypervisor executing on an information handling system, but such provision of bare-metal cloud services may lead to loss of traditionally-collected telemetry information that may be desired to manage information handling system workloads and guarantee service level agreements.

SUMMARY

In accordance with the teachings of the present disclosure, the disadvantages and problems associated with existing approaches to collecting telemetry data for an information handling system may be reduced or eliminated.

In accordance with embodiments of the present disclosure, an information handling system comprising may include a processor, a management controller communicatively coupled to the processor and configured for out-of-band management of the information handling system, and a smart network interface card communicatively coupled to the processor and the management controller and configured to receive telemetry information from telemetry sources of the information handling system and perform advanced processing of the telemetry information.

In accordance with these and other embodiments of the present disclosure, a method may include, in an information handling system comprising a processor, a management controller communicatively coupled to the processor and configured for out-of-band management of the information handling system, and a smart network interface card communicatively coupled to the processor and the management controller: receiving, by the smart network interface card, telemetry information from telemetry sources of the information handling system; and performing, by the smart network interface card, advanced processing of the telemetry information.

In accordance with these and other embodiments of the present disclosure, an article of manufacture may include a non-transitory computer-readable medium and computer-executable instructions carried on the computer-readable medium, the instructions readable by a processor of a smart network interface card of an information handling system comprising a host processor communicatively coupled to the smart network interface card and a management controller communicatively coupled to the host processor and the smart network interface card and configured for out-of-band management of the information handling system, the instructions, when read and executed, for causing the processor to: receive telemetry information from telemetry sources of the information handling system; and perform advanced processing of the telemetry information.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
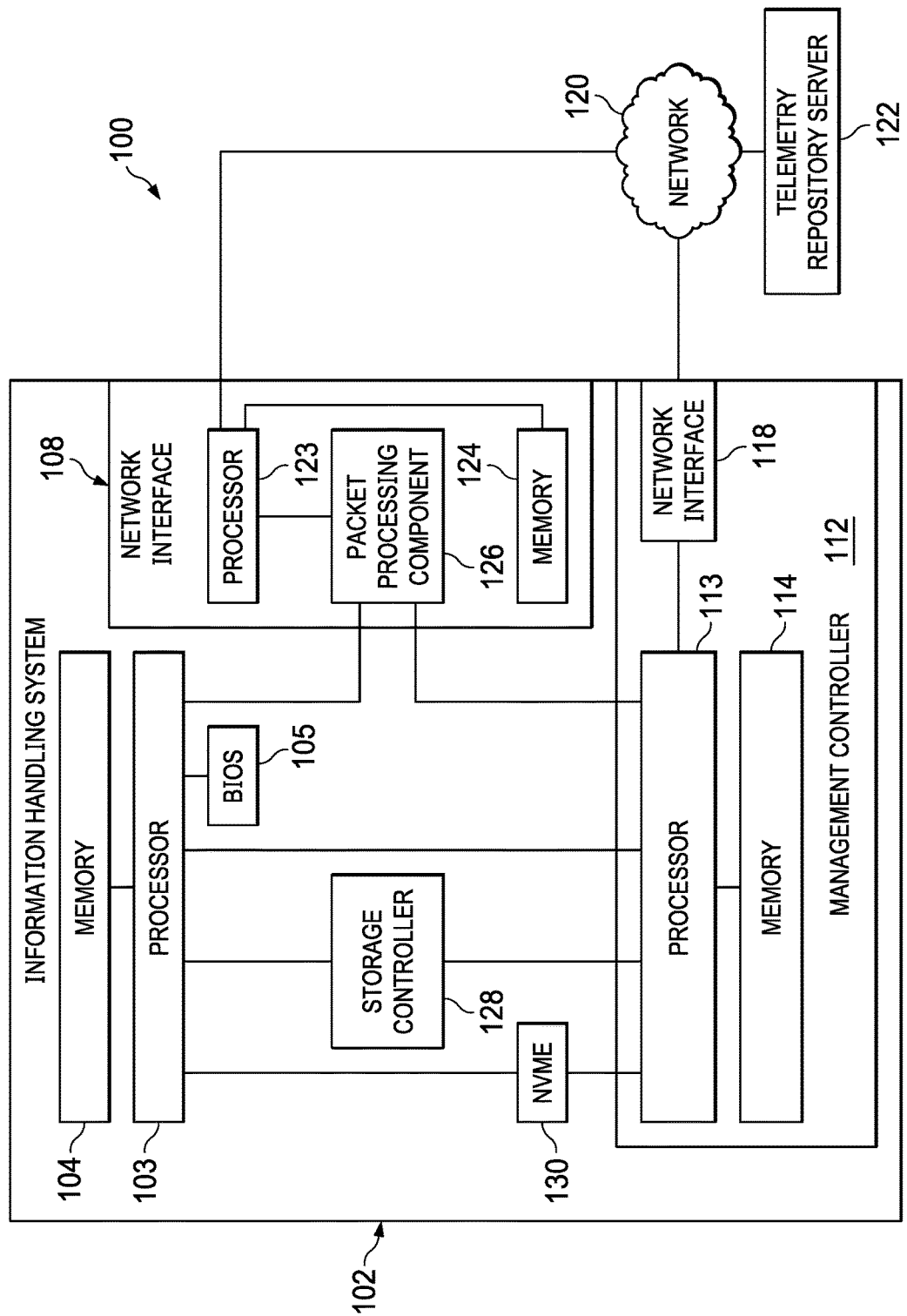
FIG. 1 illustrates a block diagram of an example system for enabling a smart network interface card as an advanced telemetry appliance, in accordance with embodiments of the present disclosure.

FIG. 1 illustrates a block diagram of an example system 100 for operating system deployment and lifecycle management of a smartNIC, in accordance with embodiments of the present disclosure. As shown in FIG. 1, system 100 may include an information handling system 102, a network 120, and a telemetry repository server 122.

In some embodiments, information handling system 102 may comprise or be an integral part of a server. In other embodiments, information handling system 102 may be a personal computer. In these and other embodiments, information handling system 102 may be a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a basic input/output (BIOS) system 105 communicatively coupled to processor 103, a network interface 108 communicatively coupled to processor 103, and a management controller 112 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102.

Network interface 108 may comprise any suitable system, apparatus, or device operable to serve as an interface between information handling system 102 and one or more other information handling systems. Network interface 108 may enable information handling system 102 to communicate using any suitable transmission protocol and/or standard. In these and other embodiments, network interface 108 may comprise a network interface card, or "NIC." In particular, network interface 108 may comprise a smart network interface card or "smartNIC" having a processor 123, memory 124, and packet processing component 126. A smartNIC may offer capabilities not found in traditional network interface cards (NICs). In addition to the stateful and custom offloads a smartNIC may provide, it may have an independent management domain with a separate operating system, independent credentials, and independent remote access.

Processor 123 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 123 may interpret and/or execute program instructions and/or process data stored in memory 124 and/or another component of network interface 108.

Memory 124 may be communicatively coupled to processor 123 and may include any system, device, or apparatus configured to retain program instructions and/or data for a period of time (e.g., computer-readable media). Memory 124 may include RAM, EEPROM, a PCMCIA card, flash memory, magnetic storage, opto-magnetic storage, or any suitable selection and/or array of volatile or non-volatile memory that retains data after power to network interface 108 is turned off. Memory 124 may have stored thereon software and/or firmware which may be read and executed by processor 123 for carrying out the functionality of network interface 108.

Packet processing component 126 may be communicatively coupled to processor 123, memory 124, processor 103, and/or management controller 112 and may include any system, device, or apparatus configured to act as a switching interface between components of network interface 108 and components external to network interface 108. For example, packet processing component 126 may be communicatively coupled to management controller 112 via an Inter-Integrated Circuit (I2C) bus, Peripheral Component Interconnect Express (PCIe) bus, vendor-defined message (VDM) bus, or any other suitable bus or channel. Packet processing component 126 may be implemented with an application specific integrated circuit (ASIC), field-programmable gate array (FPGA), or any other suitable digital or analog circuitry.

Management controller 112 may be configured to provide out-of-band management facilities for management of information handling system 102. Such management may be made by management controller 112 even if information handling system 102 is powered off or powered to a standby state. Management controller 112 may include a processor 113, memory 114, and an out-of-band network interface 118 separate from and physically isolated from in-band network interface 108. In certain embodiments, management controller 112 may include or may be an integral part of a baseboard management controller (BMC), a remote access controller (e.g., a Dell Remote Access Controller or Integrated Dell Remote Access Controller), or an enclosure controller. In other embodiments, management controller 112 may include or may be an integral part of a chassis management controller (CMC).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or management controller 112.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off. Memory 114 may have stored thereon software and/or firmware which may be read and executed by processor 113 for carrying out the functionality of management controller 112.

Network interface 118 may comprise any suitable system, apparatus, or device operable to serve as an interface between management controller 112 and/or one or more other information handling systems. Network interface 118 may enable management controller 112 to communicate using any suitable transmission protocol and/or standard. In these and other embodiments, network interface 118 may comprise a network interface card, or "NIC." A smartNIC may also be known as a Data Processing Unit (DPU), functional accelerator card (FAC), functional off-load coprocessor (FOCP), or distributed services card (DSC).

Storage controller 128 may include any system, apparatus, or device operable to manage the communication of data between processor 103 and storage resources. In certain embodiments, storage controller 128 may provide functionality including, without limitation, disk aggregation and redundancy (e.g., RAID), I/O routing, and error detection and recovery. Storage controller 128 may also have features supporting shared storage and high availability. In some embodiments, storage controller 128 may comprise a PowerEdge RAID Controller (PERC) manufactured by Dell Inc. As shown in FIG. 1, storage controller 128 may also be communicatively coupled to management controller 112 via a sideband interface, such as a Peripheral Component Interconnect Express (PCIe) Vendor-Defined Messaging (VDM) interface, Inter-Integrated Circuit (I2C) interface, or other suitable interface.

NVM 130 may be communicatively coupled to processor 103 and may include any system, device, or apparatus configured to retain program instructions and/or data for a period of time (e.g., computer-readable media) and comprising non-volatile memory that retains data after power to information handling system 102 is turned off. NVM 130 may include flash memory, a solid state drive, and/or other non-volatile memory. In some embodiments, NVM 130 may conform to the Non-Volatile Memory Express (NVMe) standard. As shown in FIG. 1, NVM 130 may also be communicatively coupled to management controller 112 via a sideband interface, such as a Peripheral Component Interconnect Express (PCIe) Vendor-Defined Messaging (VDM) interface, Inter-Integrated Circuit (I2C) interface, or other suitable interface.

In addition to processor 103, memory 104, BIOS 105, network interface 108, management controller 112, storage controller 128, and NVM 130, information handling system 102 may include one or more other information handling resources.

Network 120 may comprise a network and/or fabric configured to couple information handling system 102 and provisioning server 122 to each other and/or one or more other information handling systems. In these and other embodiments, network 120 may include a communication infrastructure, which provides physical connections, and a management layer, which organizes the physical connections and information handling systems communicatively coupled to network 120. Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 120 may transmit data via wireless transmissions and/or wire-line transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof.

Telemetry repository server 122 may comprise an information handling system, and may include any system, device, or apparatus configured to facilitate storage of telemetry information from network interface 108, as described in greater detail below.

In operation, management controller 112 may collect a hardware inventory regarding information handling resources of information handling system 102, and network interface 108 may receive such inventory from management controller 112. Further, based on communication of data between processor 103 and network interface 108, network interface 108 may perform advanced processing of telemetry metrics (e.g., collect, correlate, and sequence) associated with information handling system 102, and communicate such telemetry metrics to telemetry repository server 122 via network 120.

Advantageously, use of network interface 108 as a telemetry appliance may allow for collecting telemetry data regarding processor 103, management controller 112, and network interface 108 itself up until the point that an operating system executing on processor 103 or operating system executing on management controller 112 fails, but because network interface 108 may remain active after such failure, network interface 108 may continue to process available telemetry metrics. Further, use of network interface 108 as a telemetry appliance may provide an out-of-band method of analyzing a rich telemetry data set over time intervals using network interface 108 and management controller 112. In addition, use of network interface 108 as a telemetry appliance may enable visualization of telemetry data on an application-by-application basis, may enable identification of potential causes of performance outliers in out-of-band telemetry data, and provide a platform for a centralized analytics application (e.g., executing on telemetry repository server 122) to remotely deploy an application on network interface 106 for performing local analytics of telemetry data. Moreover, network interface 108 may provide continuous telemetry data processing independent of a host operating system status and/or hardware state of information handling system 102.

Accordingly, a telemetry agent comprising a program of instructions may execute on processor 123 of network interface 108 in order to perform the telemetry appliance functionality of network interface 108 described herein. For example, as described below, such telemetry agent may implement an end-to-end virtualization engine, a monitoring, analysis, and reporting engine, and an expert system analyzer.

The monitoring, analysis, and reporting engine may perform continuous collection of telemetry metadata (e.g., counters, statistics, metrics, forensics, resource allocation, etc.) from one or more applications executing on processor 103 and store and process telemetry data independent of host operating status and a platform power state of information handling system 102. The monitoring, analysis, and reporting engine may perform event collection, event correlation, and event sequencing.

Figure 2:
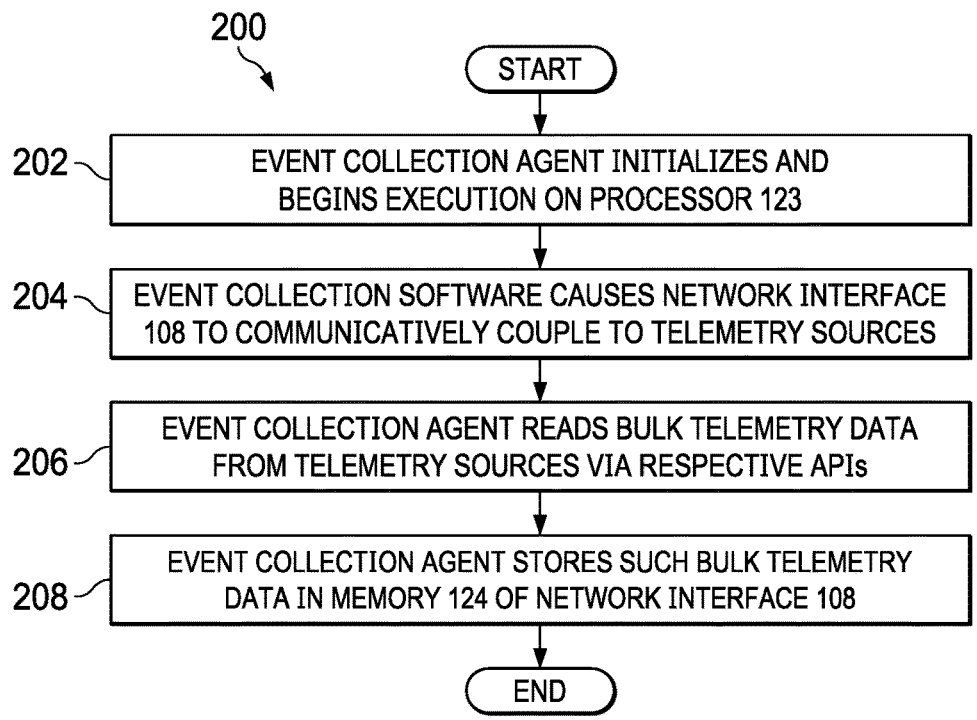
FIG. 2 illustrates a flow chart of an example method for event collection by an event collection agent of a monitoring, analysis, and reporting engine, in accordance with embodiments of the present disclosure.

FIG. 2 illustrates a flow chart of an example method 200 for event collection by an event collection agent of a monitoring, analysis, and reporting engine, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, the event collection agent may initialize and begin execution on processor 123. At step 204, event collection software may cause network interface 108 to communicatively couple to telemetry sources (e.g., operating system executing on processor 103, Peripheral Component Interconnect Express (PCI) interfaces, processor 103, memory 104, storage resources of information handling system 102, and telemetry sources within network interface 108 itself).

In some embodiments, such communicative coupling to telemetry sources may be via a cache-coherent Compute Express Link (CXL) or other suitable link.

At step 206, the event collection agent may read bulk telemetry data from the telemetry sources via respective application programming interfaces (APIs) of such telemetry sources. At step 208, the event collection agent may store such bulk telemetry data in memory 124 of network interface 108. After completion of step 208, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

Figure 3:
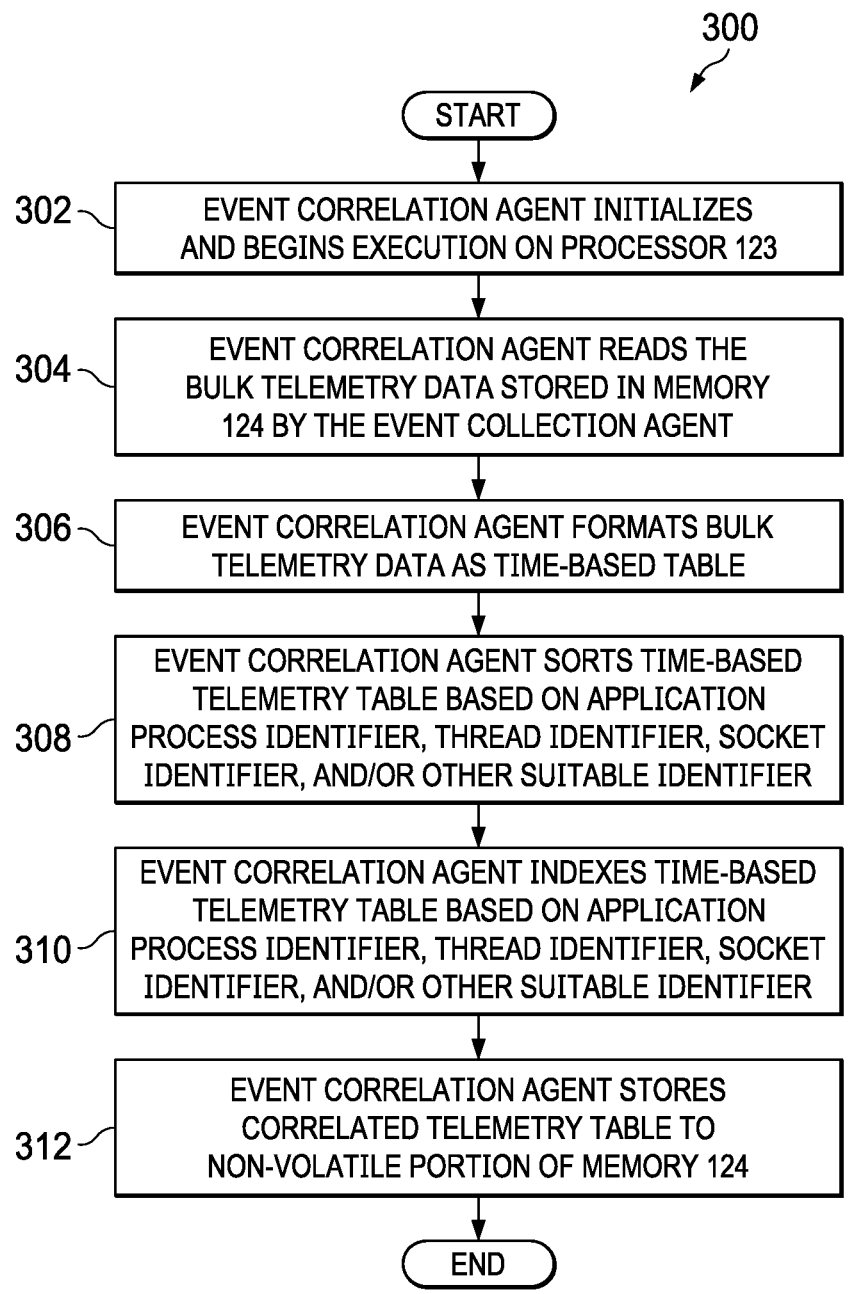
FIG. 3 illustrates a flow chart of an example method for event correlation by an event correlation agent of a monitoring, analysis, and reporting engine, in accordance with embodiments of the present disclosure.

FIG. 3 illustrates a flow chart of an example method 300 for event correlation by an event correlation agent of a monitoring, analysis, and reporting engine, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, the event correlation agent may initialize and begin execution on processor 123. At step 304, the event correlation agent may read the bulk telemetry data stored in memory 124 by the event collection agent. At step 306, the event correlation agent may format the bulk telemetry data as a time-based table. At step 308, the event correlation agent may sort the time-based telemetry table based on application process identifier, thread identifier, socket identifier, and/or other suitable identifier. At step 310, the event correlation agent may index the time-based telemetry table based on application process identifier, thread identifier, socket identifier, and/or other suitable identifier. At step 312, the event correlation agent may store the correlated telemetry table to a non-volatile portion (e.g., flash memory, solid state disk) of memory 124. After completion of step 312, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

Figure 4:
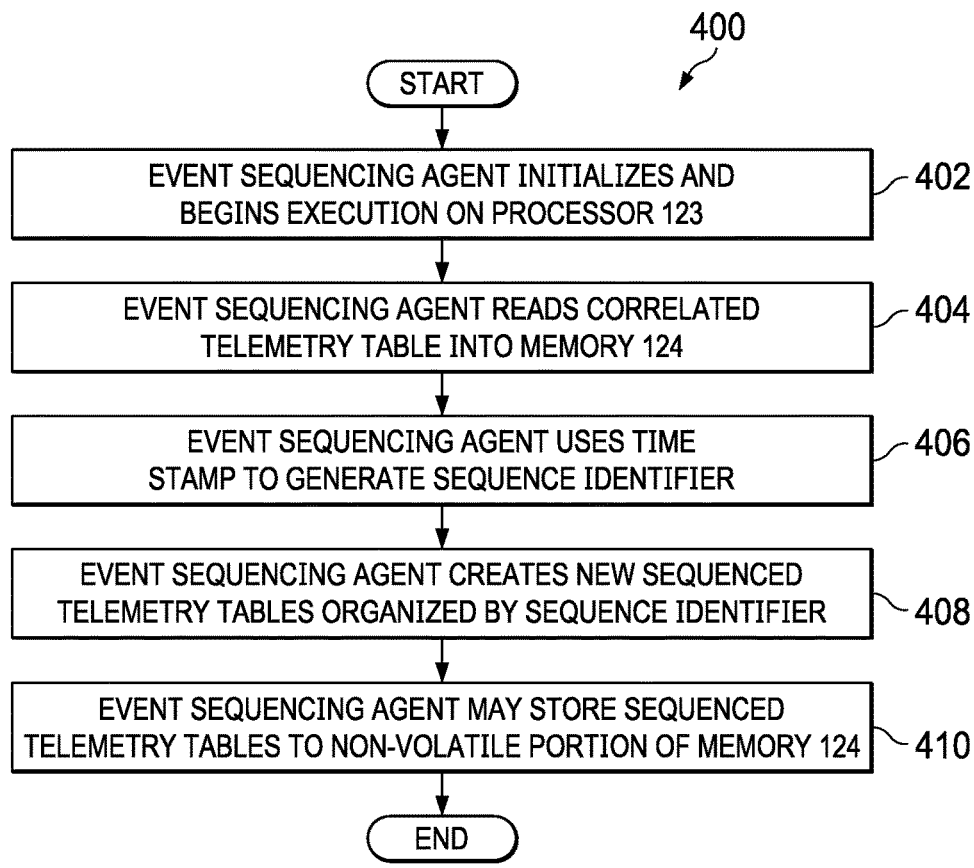
FIG. 4 illustrates a flow chart of an example method for event sequencing by an event sequencing agent of a monitoring, analysis, and reporting engine, in accordance with embodiments of the present disclosure.

FIG. 4 illustrates a flow chart of an example method 400 for event sequencing by an event sequencing agent of a monitoring, analysis, and reporting engine, in accordance with embodiments of the present disclosure. According to some embodiments, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen.

At step 402, the event sequencing agent may initialize and begin execution on processor 123. At step 404, the event sequencing agent may read the correlated telemetry table into memory 124. At step 406, the event sequencing agent may use a time stamp to generate a sequence identifier. At step 408, the event sequencing agent may create new sequenced telemetry tables organized by sequence identifier. At step 410, the event sequencing agent may store the sequenced telemetry tables to a non-volatile portion (e.g., flash memory, solid state disk) of memory 124. After completion of step 410, method 400 may end.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using information handling system 102 or any other system operable to implement method 400. In certain embodiments, method 400 may be implemented partially or fully in software and/or firmware embodied in computer-readable media.

The end-to-end virtualization engine implemented by the telemetry agent may receive bulk telemetry data from telemetry sources regarding an application executing processor 103 and characterize the application based on the bulk telemetry data. Such characterization may include one or more of determining resource status/utilization versus capacity relative to an application, identifying resource issues associated with the application, identifying error conditions associated with the application, identifying performance issues associated with the application, and/or identifying configuration issues associated with the application. Such capabilities of the end-to-end virtualization engine may be used for server capacity planning, system workload profiling, end-to-end troubleshooting, local data collection, analytics, remediation, streaming of results to a centralized monitoring tool, and/or defining a composable system.

Figure 5:
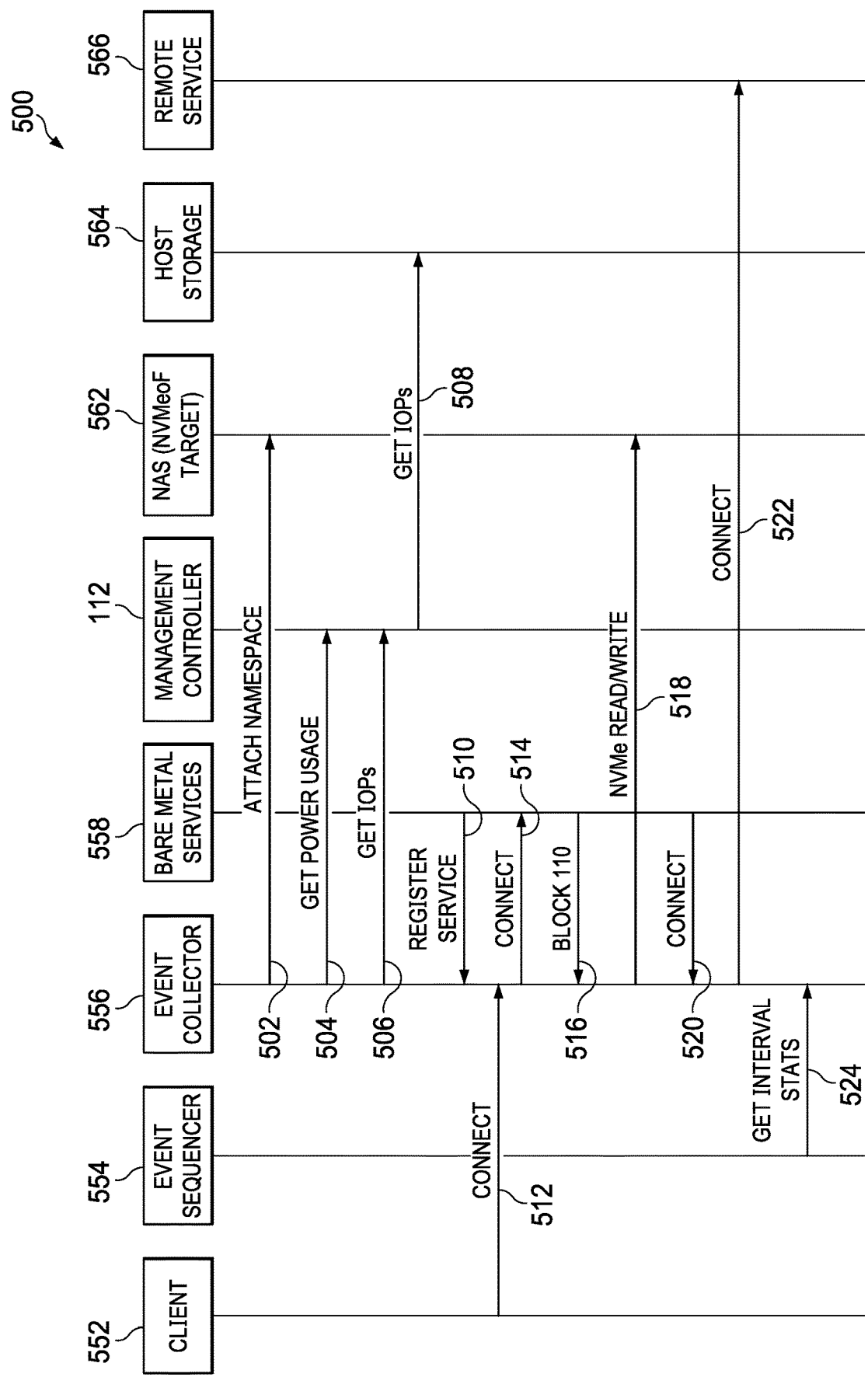
FIG. 5 illustrates a flow chart of an example method for event collection of telemetry data without a host processor, in accordance with embodiments of the present disclosure.

FIG. 5 illustrates a flow chart of an example method 500 for event collection of telemetry data without a host processor (e.g., a "bare metal" system without processor 103), in accordance with embodiments of the present disclosure. According to some embodiments, method 500 may begin at step 502. As noted above, teachings of the present disclosure may be implemented in a variety of configurations of information handling system 102. As such, the preferred initialization point for method 500 and the order of the steps comprising method 500 may depend on the implementation chosen.

At step 502, an event collector 556 may attach a namespace of a network attached storage (NAS) 562 (e.g., an NVMe device of a target for a read or write operation). At step 504, event collector 556 may obtain power usage statistics from management controller 112. At step 506, event collector 556 may request input/output operations per second (IOPs) statistics from NAS 562, and at step 508, may request IOPs statistics from host storage 564.

At step 510, bare metal services 558 may register with event collector 556. At step 512, a client 552 may connect with event collector 556 and at step 514 may connect with bare metal services 558. At step 516, bare metal services 558 may perform block input/output (I/O) operations with event collector 556. At step 518, event collector 556 may perform an NVMe read/write operation to NAS 562.

At step 520, bare metal services 558 may connect to event collector 556 and at step 522, event collector 556 may connect with a remote service 566 (e.g., telemetry repository server 122). Accordingly, at step 524, event sequencer 554 may get interval statistics via event collector 556.

Although FIG. 5 discloses a particular number of steps to be taken with respect to method 500, method 500 may be executed with greater or fewer steps than those depicted in FIG. 5. In addition, although FIG. 5 discloses a certain order of steps to be taken with respect to method 500, the steps comprising method 500 may be completed in any suitable order.

Method 500 may be implemented using information handling system 102 or any other system operable to implement method 500. In certain embodiments, method 500 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
a processor executing a host operating system;
a baseboard management controller communicatively coupled to the processor and configured for out-of-band management, via a management controller network interface, of the information handling system; and
a smart network interface card, distinct from the baseboard management controller network interface, communicatively coupled to the processor and the baseboard management controller, wherein the smart network interface card includes a separate operating system, distinct from the host operating system, wherein the smart network interface card is configured to:
receive telemetry information from telemetry sources of the information handling system;
perform advanced processing, independent of a status of the host operating system, of the telemetry information; and
communicate processed telemetry information to a telemetry repository server communicatively coupled to the smart network interface card.

2. The information handling system of claim 1, wherein performing advanced processing of the telemetry information comprises:
collecting bulk telemetry information from the telemetry sources;
correlating the bulk telemetry information to generate correlated telemetry information; and
sequencing the correlated telemetry information to generate sequenced telemetry information.

3. The information handling system of claim 2, wherein correlating the bulk telemetry information to generate correlated telemetry information comprises formatting the bulk telemetry information based on time to generate a time-based table.

4. The information handling system of claim 3, wherein correlating the bulk telemetry information to generate correlated telemetry information further comprises sorting and indexing the time-based telemetry table based on one or more of application process identifiers, thread identifiers, and socket identifiers.

5. The information handling system of claim 2, wherein sequencing the correlated telemetry information to generate sequenced telemetry information comprises:
using time stamps to generate sequence identifiers; and
generating sequenced telemetry tables organized by sequence identifier.

6. The information handling system of claim 1, wherein:
the telemetry information comprises telemetry data regarding an application executing on the processor; and
the smart network interface card is further configured to characterize the application based on the telemetry data.

7. The information handling system of claim 1, wherein the smart network interface card is associated with an independent management domain and independent remote access.

8. A method comprising, in an information handling system comprising a processor executing a host operating system, a baseboard management controller communicatively coupled to the processor and configured for out-of-band management, via a management controller network interface, of the information handling system, and a smart network interface card, distinct from the baseboard management controller network interface, communicatively coupled to the processor and the baseboard management controller, wherein the smart network interface card includes a separate operating system, distinct from the host operating system:
receiving, by the smart network interface card, telemetry information from telemetry sources of the information handling system;
performing, by the smart network interface card independent of a status of the host operating system, advanced processing of the telemetry information; and
communicating processed telemetry information to a telemetry repository server communicatively coupled to the smart network interface card.

9. The method of claim 8, wherein performing advanced processing of the telemetry information comprises:

collecting bulk telemetry information from the telemetry sources;

correlating the bulk telemetry information to generate correlated telemetry information; and sequencing the correlated telemetry information to generate sequenced telemetry information.

10. The method of claim 9, wherein correlating the bulk telemetry information to generate correlated telemetry information comprises formatting the bulk telemetry information based on time to generate a time-based table.

11. The method of claim 10, wherein correlating the bulk telemetry information to generate correlated telemetry information further comprises sorting and indexing the time-based telemetry table based on one or more of application process identifiers, thread identifiers, and socket identifiers.

12. The method of claim 9, wherein sequencing the correlated telemetry information to generate sequenced telemetry information comprises:

using time stamps to generate sequence identifiers; and generating sequenced telemetry tables organized by sequence identifier.

13. The method of claim 8, wherein:

the telemetry information comprises telemetry data regarding an application executing on the processor; and the method further comprises characterizing, by the smart network interface card, the application based on the telemetry data.

14. An article of manufacture comprising:

a non-transitory computer-readable medium; and computer-executable instructions carried on the computer-readable medium, the instructions readable by a processor of a smart network interface card of an information handling system comprising a host processor, executing a host operating system, communicatively coupled to the smart network interface card and a baseboard management controller, including a management controller network interface, distinct from the smart network interface card, communicatively coupled to the host processor and the smart network interface card and configured for out-of-band management, via the baseboard management controller network interface of the information handling system, wherein the smart network interface card includes a separate operating system, distinct from the host operating system and wherein the instructions, when read and executed, for causing the processor to:

receive telemetry information from telemetry sources of the information handling system;

perform, independent of a status of the host operating system, advanced processing of the telemetry information; and communicate processed telemetry information to a telemetry repository server communicatively coupled to the smart network interface card.

15. The article of claim 14, wherein performing advanced processing of the telemetry information comprises:

collecting bulk telemetry information from the telemetry sources;

correlating the bulk telemetry information to generate correlated telemetry information; and sequencing the correlated telemetry information to generate sequenced telemetry information.

16. The article of claim 15, wherein correlating the bulk telemetry information to generate correlated telemetry information comprises formatting the bulk telemetry information based on time to generate a time-based table.

17. The article of claim 16, wherein correlating the bulk telemetry information to generate correlated telemetry information further comprises sorting and indexing the time-based telemetry table based on one or more of application process identifiers, thread identifiers, and socket identifiers.

18. The article of claim 15, wherein sequencing the correlated telemetry information to generate sequenced telemetry information comprises:

using time stamps to generate sequence identifiers; and generating sequenced telemetry tables organized by sequence identifier.

19. The article of claim 14, wherein:

the telemetry information comprises telemetry data regarding an application executing on the host processor; and the smart network interface card is further configured to characterize the application based on the telemetry data.

* * * * *